United States Patent [19]

Rusch et al.

[11] Patent Number: 5,178,060

[45] Date of Patent: Jan. 12, 1993

[54] FOOD PROCESSING VAT WITH CONTOURED BOTTOM AND MATED AGITATOR BLADE

[75] Inventors: Gerald A. Rusch, Fond du Lac, Wis.; Villy S. Rasmussen, Kolding, Denmark

[73] Assignee: Damrow Company, Fond du Lac, Wis.

[21] Appl. No.: 792,293

[22] Filed: Nov. 14, 1991

[51] Int. Cl.$^5$ .................. A01J 13/00; A01J 25/00
[52] U.S. Cl. ........................... 99/453; 99/460; 99/462; 366/149; 366/297; 366/301
[58] Field of Search .......... 99/348, 452, 453, 460–462, 99/463, 464, 466; 366/292, 149, 297, 298–301; 241/98, 101.1, 199.12, 65

[56] References Cited

U.S. PATENT DOCUMENTS

| | | | |
|---|---|---|---|
| Re. 29,967 | 4/1979 | Hazen | 99/462 |
| 2,007,422 | 7/1935 | Damrow | 99/460 |
| 2,814,114 | 11/1957 | Nessler et al. | 99/463 X |
| 3,733,702 | 5/1973 | Robertson et al. | 99/462 |
| 3,858,855 | 1/1975 | Hazen | 99/462 |
| 3,988,011 | 10/1976 | Kressin | 366/297 |
| 4,050,369 | 9/1977 | Mulvihill | 99/463 |
| 4,206,880 | 6/1980 | Stanton | 241/101.1 |
| 4,321,860 | 3/1982 | Hazen | 99/453 |
| 4,612,853 | 9/1986 | Kostiainen et al. | 99/461 |
| 4,938,424 | 7/1990 | Pittelko | 99/462 |
| 4,989,504 | 2/1991 | Jay | 366/301 |

FOREIGN PATENT DOCUMENTS

| | | | |
|---|---|---|---|
| 2510904 | 9/1975 | Fed. Rep. of Germany | 99/463 |
| 780606 | 8/1957 | United Kingdom | 99/463 |

Primary Examiner—Timothy F. Simone
Attorney, Agent, or Firm—Andrus, Sceales, Starke & Sawall

[57] ABSTRACT

A food processing vat having an outer shell and an inner vessel to contain a food product with a chamber therebetween includes a contoured bottom having a high point and a low point wherein the food product naturally gravitates toward the low point which a drain may be connected for draining the food product from the vessel. Agitation means in the vessel include a lower blade assembly which is adapted to conform substantially to the contoured bottom of the vessel. Heating means disposed in the chamber between the vessel and the outer shell provide for uniform heating of the vessel and the food product contained therein.

19 Claims, 3 Drawing Sheets

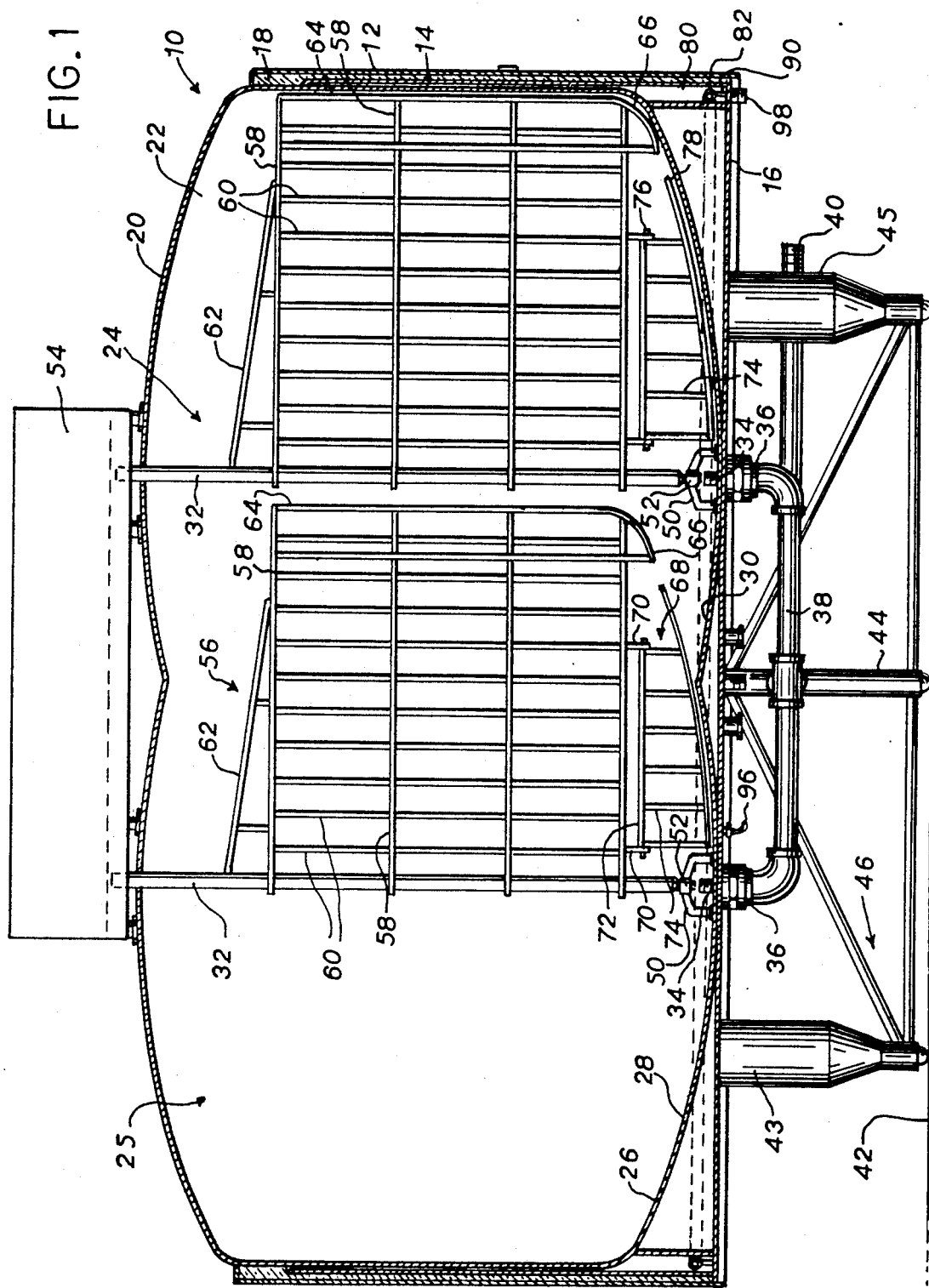

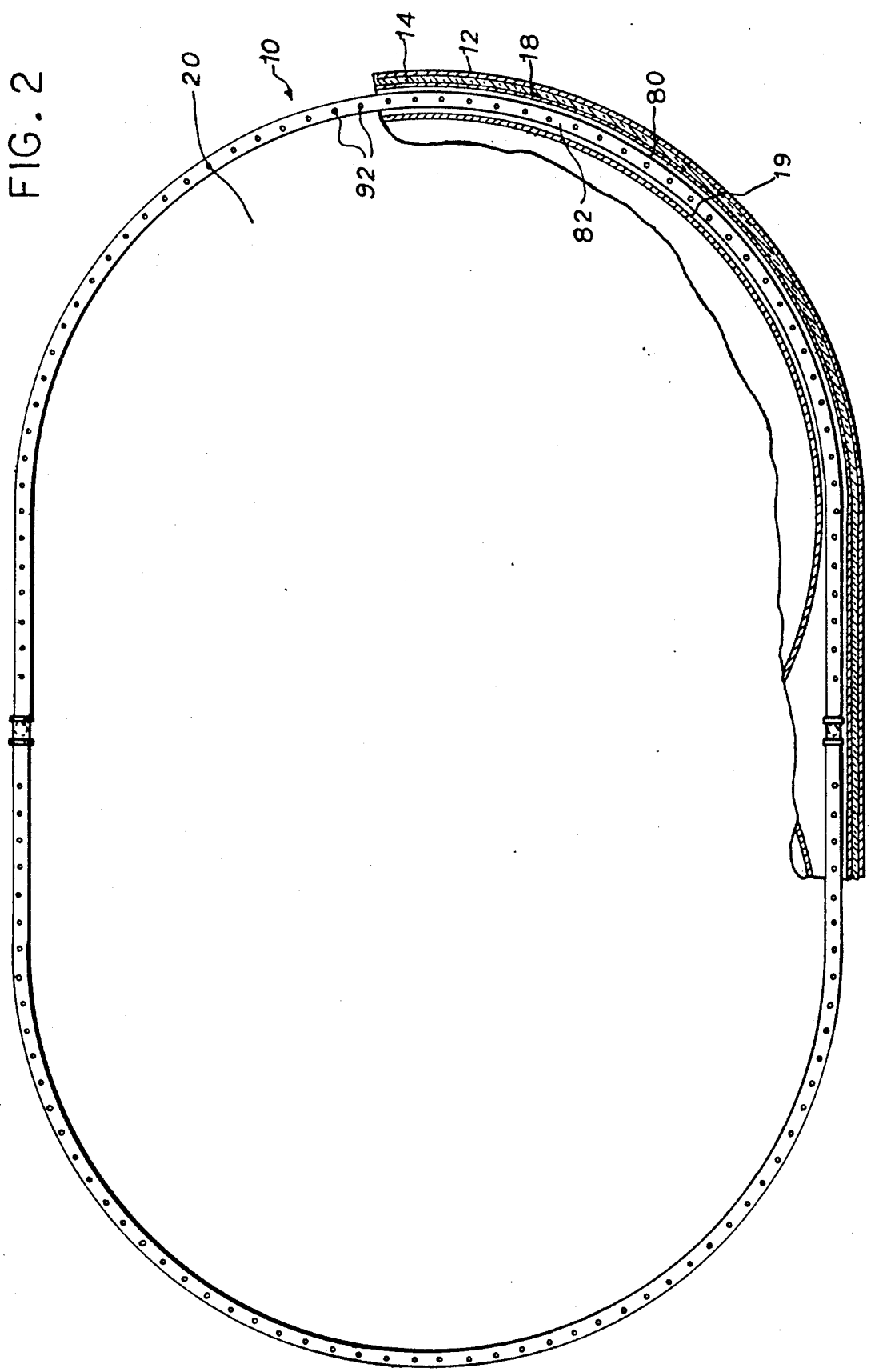

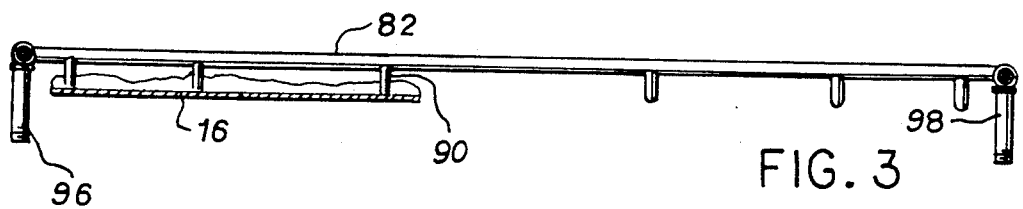
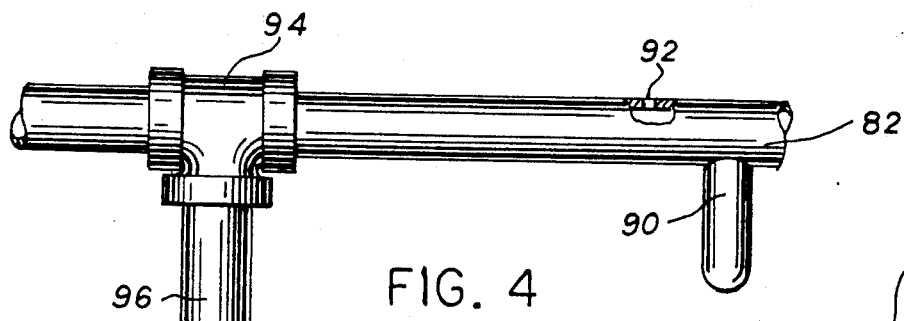
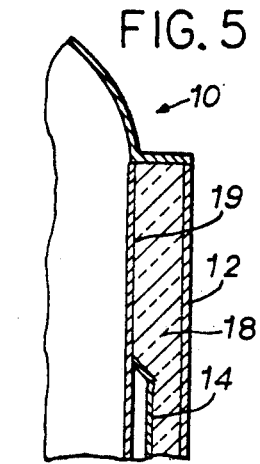
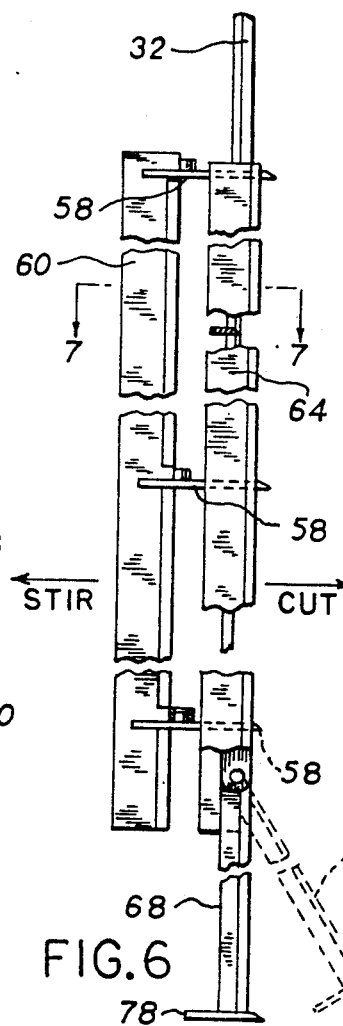
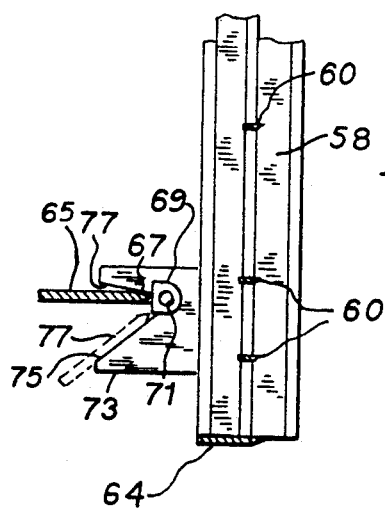

FOOD PROCESSING VAT WITH CONTOURED BOTTOM AND MATED AGITATOR BLADE

BACKGROUND OF THE INVENTION

1. Field Of The Invention

The invention is related generally to food processing vats and is particularly directed to a cheese making vat having an outer shell and an inner processing vessel.

2. Description Of The Prior Art

Cheese making vats of the type comprising an outer, generally oval shell and an inner processing vessel are known in the art. An example of such a vat is disclosed in U.S. Pat. No. Re 29,967 which discloses a processing vessel composed of a pair of generally cylindrical sections that intersect along vertical apices so that the vessel, in horizontal section, has a generally figure-8 shape. An agitator mechanism is located in each cylindrical section and comprises a reversible vertical shaft that carries a radially extending frame composed of a series of vertical and horizontal blades. One edge of each blade is sharpened, while the opposite edge is blunt. When the frame is rotated in the cutting direction, the sharpened edges lead in the direction of rotation to cut the curd. When the frame is rotated in the opposite or stirring direction, the blunt or flat edges lead in the direction of rotation to provide a stirring action. The food processing vat shown in U.S. Pat. No. Re 29,967 also includes one or more swinging blades which are mounted on the frame. The swinging blades are constructed so that when the frame is rotated in the cutting direction, the sharpened edge of the swinging blade will lead in the direction of rotation when the frame is rotated in the opposite stirring direction, the blade will swing to a position where a side surface is disposed generally normal to the direction of rotation to thereby provide a greater frontal area for stirring.

U.S. Pat. No. 4,938,424 also discloses a food processing vat having an outer, generally oval shell and a processing vessel to contain a mixture of curds and whey, the vessel being spaced inwardly of the shell and comprising a pair of generally cylindrical sections that intersect along vertical apices that extend the full height of the cylindrical sections. The agitator mechanism is mounted in each cylindrical section of the vessel and each agitator mechanism includes a vertical, reversible shaft that carries a radially extending frame composed of a series of horizontal, vertical blades. A vertical swinging blade is mounted for pivotal movement on the outer end of the frame and the swinging blade is provided with a sharpened vertical edge. The blade is freely swingable from a cutting position where the sharpened edge leads in the direction of rotation to an angular position where the blade is disposed in an angle to the direction of rotation and the trailing edge of the blade is located adjacent the side wall of the cylindrical section. This swinging blade construction provides improved agitation for curds and whey or other food product, particularly in the area adjacent the side walls of the cylindrical sections.

It will be noted that the vessel bottom in both the configurations of U.S. Pat. No. Re 29,967 and U.S. Pat. No. 4,938,424 is substantially flat. The bottom drain for draining the mixed food product from the vessel is generally located adjacent one side wall of the cylindrical section, and when installed, the vessel is inclined toward the drain. Recent developments have led to the incorporation of a contoured vessel bottom, using a concave dish shape for each of the cylindrical sections, whereby the processed food gravitates toward the center low point of the dish. The low point or center of the dish is in communication with the drain, by which the vessel contents may be removed. This modification has greatly enhanced the processed food removal operation. Also, this modification permits the food processing vat to be installed on a horizontal plane rather than on the inclined slope utilized with prior art vat systems. An example of a food processing vat utilizing a contoured vessel bottom with a double bottom outlet is the VSR cheese vat model "88" manufactured by VSR Engineering, Kolding, Denmark.

SUMMARY OF THE INVENTION

The subject invention is directed to an improved agitation system for a food processing vat of the type having a contoured vessel bottom and dual outlet configuration. While the dual outlet configuration in combination with the contoured vessel bottom of the prior art greatly improved the food removal operation, the agitation means of the prior art do not provide optimum agitating and mixing action when used in combination with the contoured vessel bottom.

The subject invention is directed to an agitation means including a swinging blade which is specifically designed to conform to the contoured vessel bottom. The swinging blade has a substantially flat surface which is of the same contour as the vessel bottom and is adapted to be parallel to the vessel bottom when the vertical shaft is rotated in the cutting direction. The flat, contoured blade is adapted to swing out to a substantially horizontal position when the shaft is rotated in the mixing direction, for providing a paddle for enhancing the mixing of the contents in the vat.

The subject invention also includes a modified heating system which is contained in the chamber between the food vessel and the outer shell of the vat. A continuous tube is disposed near the flat bottom of the shell and includes a plurality of apertures adapted for directing steam upwardly from the shell toward the vessel and along the space between the side wall of the vessel and the side wall of the shell to elevate the temperature of the vessel. A plurality of legs are attached directly to the tube for supporting the tube above the flat horizontal bottom of the shell to assure that condensed steam does not interfere with the steam being ejected from the tube.

It is, therefore, and object and feature of the subject invention to provide for an improved agitation means for food processing vat having a contoured vessel bottom.

It is another object and feature of the subject invention to provide for an agitation means having a swinging blade with a cutting edge of the same contour and disposed substantially parallel to the contoured vessel bottom when the agitating means is rotated in the cutting direction, the swinging blade pivoting upward to a substantially horizontal position for providing an enlarged paddle area when the agitator is rotated in the mixing direction.

It is another object and feature of the subject invention to provide for an improved heating mechanism for uniformly heating the food vessel.

Other objects and features of the subject invention will be readily apparent from the accompanying drawings and description of the preferred embodiment.

BRIEF DESCRIPTION OF THE DRAWINGS

FIG. 1 is a side sectional view of the food processing vat of the subject invention.

FIG. 2 is a top plan view, partially in section, of the food processing vat of FIG. 1.

FIG. 3 is a partial view, looking in the same direction as FIG. 1, showing the steam delivery system.

FIG. 4 is an enlarged, fragmentary view looking in the same direction as FIG. 3.

FIG. 5 is an enlarged, fragmentary view looking in the same direction as FIG. 1.

FIG. 6 is a section view taken along line 6—6 of FIG. 1 and showing the agitation means with the swinging blade disposed in the horizontal, mixing position.

FIG. 7 is a fragmentary section view taken along line 7—7 of FIG. 6.

DESCRIPTION OF THE PREFERRED EMBODIMENT

A sectional side view of a food processing vat in accordance with the invention is shown in FIG. 1. As there shown, the vat 10 comprises an outer shell having an outer side wall 12, an inner side wall 14 and a substantially flat bottom 16. In the preferred embodiment, an insulating material 18 is disposed between the outer side wall 12 and the inner side wall 14 to provide an envelope for containing heat within the vat. The shell is generally oval with a flat bottom wall 16 and a domed top or roof 20. The inner and outer walls 12 and 14 are generally formed of a metal such as stainless steel or the like. Located within the shell is a vessel 22 having a side wall 19 spaced inwardly of the inner wall of the shell. The side wall 19 is integral with the top 22 of the vessel and the bottom 26 which is defined by the intersecting dishes 28, 30. The vessel is adapted for containing the food product such as, by way of example, a mixture of curds and whey. The vessel 22 is preferably constructed of a metal such as stainless steel or the like, and is composed of a pair of generally cylindrical sections 24 and 25 conforming substantially to the configuration generally shown and described in U.S. Pat. No. 4,938,424, incorporated by reference herein. The cylindrical sections 24 and 25 intersect so that the vessel 22 is provided with a generally figure-8 configuration. The cylindrical sections intersect at a pair of spaced, vertically extending apices which extend the full height of the sections.

It is a feature of the present invention that the bottom vessel wall 26 be contoured into a pair of concave, intersecting dishes 28 and 30, the dishes intersecting at the intersecting apices of the cylindrical sections.

The axis of each vertical agitating shaft 32 intersects the center and lowest point 34 of the respective dish 28, 30. The drain for draining the processed food contents from the vessel 22 includes a pair of drain couplings 36, one each disposed at the center low point 34 of the respective dish 28, 30 as shown in FIG. 1. The drain couplings 36 are connected to a common conduit 38 which is attached to a drain system 40. The drain coupling of the subject invention permits the vat 10 to be mounted or installed on a substantially horizontal surface as indicated by the floor line 42, with the processed food gravitating toward the low point 34 of each dish 28, 30 of the vessel bottom. In the preferred embodiment of the subject invention, the vat is supported by a plurality of legs 43, 44 and 45 connected by an interconnecting framework 46. The legs are secured to the horizontal bottom wall 16 of the shell.

In the preferred embodiment of the invention, the vertical shafts 32 are each supported by a bracket 50 which includes a cylindrical socket 52 for receiving the lower end of the shaft and journaling it for rotation. Each of the shafts 32 are received in a drive means 54, whereby the rotation and synchronization of the shafts is controlled in the well-known manner. Each shaft 32 supports an outwardly or radially extending frame 56 comprising a plurality of horizontal cross members 58 and spaced vertical members 60. The horizontal frame members 58 and vertical frame members 60 each define a blade having one edge which is sharpened to define a cutting blade for cutting the food product when the frame is rotated in a first direction. The opposite edge of each of the frame members is blunt to provide a mixing paddle when the frame is rotated in the opposite direction. Typically, the horizontal blades have a width in the range of 3.5 to 1 to 4.5 to 1 with respect to the width of the vertical blades and have a thickness in the range of 3.5 to 1 to 4.5 to 1 with respect to the thickness of the vertical blades. As an example, the horizontal blades 58 have a thickness of 1/16th inch and a width of approximately 1 inch. The upper end of each frame 56 is connected to each vertical shaft 32 by a brace 62.

As shown in FIG. 7, a side swing blade 65 is mounted at the outer end 64 of each frame. The blade 65 has a sharpened edge 67 which leads in the cutting direction and a series of annular bosses 69 are secured to spaced locations along the length of the sharpened edge 67. The bosses are journaled on upstanding pins 71 on plates 73 that extend outwardly from the blunt edges of the horizontal blades 58. As best shown in FIG. 7, the outer edge of each plate 73 is provided with a generally V-shaped notch 75 which is bordered by a pair of edges 77. When the frame is rotated in the cutting direction, the sharpened edge 67 of the blade 65 will face in the cutting direction. When the frame is rotated in the opposite or stirring direction, the blade 65 will pivot and engage the edge 79, to position the blade 65 at an acute angle with respect to the direction of rotation.

As can be seen in FIG. 1, the blade assembly 65 includes a curved lower end 66 conforming substantially to the contoured, curved surface of the intersection of the vessel side wall and the vessel dish bottom.

A primary swinging blade assembly 68 is disposed between the side blade 65 and the vertical drive shaft 32. In the preferred embodiment, a pair of mounting brackets 70 are provided and depend from the lowermost horizontal member 58. The uppermost frame member 72 of the swinging blade assembly spans the bracket 70. A plurality of vertical members 74 depend from the horizontal frame member 72. A pair of posts 76 extend outwardly from the outermost frame members 74 and are received in apertures provided in the braces 70 for pivotally supporting the primary blade assembly 68. The blade 78 comprises a substantially flat member which has been shaped to substantially conform to the contour of the dished bottom of the vessel.

As is shown in FIG. 1, the primary blade assembly 68 is in a substantially vertical position when the shaft 32 is rotated in the cutting direction with the cutting edges of the various frame members 58 and 60 and the cutting edge of the blade 78 on the leading side of the agitation mechanism as it cuts through the food in the vessel 22. As is shown in FIG. 6, when the direction of rotation of shafts 32 is reversed, the blade 78 swings out to provide a large, flat paddle surface for mixing the contents in the vessel 22.

The heating mechanism for elevating the temperature of the vessel 22 is shown in FIGS. 2–5. As specifically shown in FIG. 2, the food processing vat 10 includes a shell defined by the outer, substantially oval side wall 12, the inner side wall 14 and an insulating jacket 18. The vessel side wall 19 is substantially cylindrical in cross section and is spaced inwardly from the inner side wall 14 of the shell. This defines a chamber 80 between the inner side wall 14 of the shell and the vessel side wall 19. As shown in FIG. 1, a continuous hollow tube 82 is mounted near the bottom wall 16 of the shell and is spaced above the bottom by a plurality of legs or supports 90. As better seen in FIG. 2, the continuous tube 82 extends around the entire perimeter of the shell in the chamber 80. A plurality of apertures 92 (see also FIG. 4) are in the upper surface of the tube 82 and are adapted for directing steam, under pressure, upwardly into the chamber 80, providing a wall of steam surrounding the side wall 19 of the vessel 22. In the preferred embodiment, the tube 82 is attached via a coupling mechanism 94 to a steam inlet tube 96 for directing steam into the tube and into the chamber 80. Condensate collects on the inside surfaces of the walls 14 and 19 and drains downwardly to the bottom of the shell, where it is removed from the vat via the outlet 98. The peripheral steam jacket provided by the subject invention provides uniform heating for maintaining the temperature within the vessel 22.

While certain features and embodiments of the invention have been described in detail herein, it will be understood that the invention encompasses all modifications and enhancements within the scope and spirit of the following claims.

What is claimed is:

1. A food processing vat, comprising:
   a. an outer shell having a generally oval side wall and a bottom wall;
   b. a vessel within the shell and composed of a pair of interconnected generally cylindrical members, the cylindrical members intersecting along a pair of vertically extending apices, the vessel including a contoured vessel bottom having a pair of concave curved surfaces, each concentric with one of said cylinder members and intersecting at the apices of the intersecting cylindrical members;
   c. a drain in communication with the contoured vessel bottom at the low point of each contour; and
   d. a vertical shaft supporting an agitation means on the center axis of each cylindrical member and concentric with the respective curved surface of the contoured vessel bottom.

2. The food processing vat of claim 1, wherein said agitation means comprises a reversible rotatable shaft mounted centrally of each cylindrical member, an agitator frame extending radially outward from each shaft, and an agitator blade hingedly mounted on the frame and movable between a substantially vertical position when the shaft is rotated in one direction and a substantially horizontal position when the shaft is rotated in the other direction, the blade substantially conforming to the contoured vessel bottom when in the vertical position.

3. The food processing vat of claim 2, wherein the blade includes a substantially flat outer edge which is parallel to the contoured vessel bottom when in the vertical position for defining a cutting edge and is substantially vertical when the blade is in the horizontal position for defining a paddle for mixing the product in the vessel.

4. The food processing vat of claim 1, wherein the drain includes a pair of outlets, one each disposed at the center of the concave bottom surface of each cylindrical section of the vessel.

5. The food processing vat of claim 1, wherein the vessel includes an outer side wall disposed inwardly of the generally oval side wall of the shell.

6. The food processing vat of claim 5, including an insulating jacket surrounding the shell side wall.

7. The food processing vat of claim 5, including heating means for elevating the temperature of the outer side wall of the vessel disposed between said vessel outer side wall and the shell side wall.

8. The food processing vat of claim 7, wherein said heating means comprises a continuous hollow tube circumscribing the vessel side wall and including a plurality of spaced upwardly directed through apertures in the tube, and means for introducing steam into said tube for releasing the steam through the apertures.

9. The food processing vat of claim 8, including means depending from said tube and in communication with the shell bottom wall for supporting the tube above the shell bottom wall.

10. The food processing vat of claim 8, wherein the shell bottom wall includes a drain for exiting the steam from the space between said vessel and said shell as it condenses.

11. The food processing vat of claim 1, including a plurality of legs for supporting said shell and vessel with said shell bottom wall in a substantially horizontal plane.

12. The food processing vat of claim 2, wherein the vertical shafts are spaced from one another a distance approximately equal to the radius of each cylinder.

13. The food processing vat of claim 12, wherein both agitating means always rotate in the same direction.

14. A food processing vat, comprising:
   a. an outer shell having a generally oval side wall and a substantially horizontal, flat bottom wall;
   b. a vessel spaced within the shell and composed of a pair of interconnected generally cylindrical members, the cylindrical members intersecting along a pair of vertically extending apices, and having a common outer side wall spaced inwardly from the shell side wall, the vessel including a contoured vessel bottom comprising a pair of concave curved surfaces, each concentric with one of said cylindrical members and intersecting at the apices of the intersecting cylindrical members, the contoured vessel bottom disposed above the outer wall of the shell;
   c. a gravity drain in communication with the contoured vessel bottom at the center of each concave curved surface; and
   d. agitation means disposed within each cylindrical member for agitating the product therein, the agitation means having a contoured bottom edge substantially conforming to the contoured vessel bottom.

15. The food processing vat of claim 14, wherein said agitation means comprises a pair of reversible rotatable shafts, one each mounted centrally of each cylindrical member, an agitator frame extending radially outward from each shaft, and an agitator blade hingedly mounted on the frame and movable between a substantially vertical position when the shaft is rotated in one direction and a substantially horizontal position when the shaft is rotated in the other direction, the blade substantially conforming to the contoured vessel bottom when in the vertical position.

16. The food processing vat of claim 14, wherein the gravity drain includes a pair of outlets, one each disposed at the center of the concave bottom surface of each cylindrical section of the vessel.

17. The food processing vat of claim 15, wherein the blade includes a substantially flat outer edge which is parallel to the contoured vessel bottom when in the vertical position for defining a cutting edge and is substantially vertical when the blade is in the horizontal position for defining a paddle for mixing the product in the vessel.

18. The food processing vat of claim 14, including heating means for elevating the temperature of the outer side wall of the vessel disposed between said vessel side wall and the shell side wall, said heating means comprising a continuous hollow tube circumscribing the vessel side wall and including a plurality of spaced upwardly directed through apertures in the tube, means for introducing steam into said tube for releasing the steam through the apertures, and means depending from said tube and in communication with the shell bottom wall for supporting the tube above the shell bottom wall.

19. The food processing vat of claim 18, including an insulating jacket surrounding the shell side wall.

* * * * *